United States Patent [19]

Mercer et al.

[11] Patent Number: 4,521,368
[45] Date of Patent: Jun. 4, 1985

[54] METHOD OF MAKING INTERNALLY CROSS-RIBBED PLASTICS MATERIAL STRUCTURE

[75] Inventors: Frank B. Mercer, Blackburn; Keith F. Martin, Lancashire, both of England

[73] Assignee: Netlon Limited, Blackburn, England

[21] Appl. No.: 510,253

[22] Filed: Jul. 1, 1983

[30] Foreign Application Priority Data

Jul. 6, 1982 [GB] United Kingdom ............... 8219458

[51] Int. Cl.³ .............................................. B29D 23/04
[52] U.S. Cl. ................... 264/514; 156/244.14; 264/564; 264/146; 264/167; 264/209.2; 425/326.1; 425/381
[58] Field of Search ............. 264/171, 173, 167, 514, 264/512, 515, 564, 209.8, 209.2, 150; 425/131.1, 133.1, 381, 462, 326.1; 156/500, 244.14, 229

[56] References Cited

U.S. PATENT DOCUMENTS

| | | | |
|---|---|---|---|
| 3,193,604 | 7/1965 | Mercer | 264/558 |
| 3,281,897 | 11/1966 | Mercer | 264/209.2 |
| 3,372,920 | 3/1968 | Corbett et al. | 264/173 |
| 3,464,450 | 9/1969 | Steffenini | 138/113 |
| 3,478,139 | 11/1969 | Martin et al. | 264/173 |
| 3,540,078 | 11/1970 | Schultz | 264/209.2 |
| 3,560,306 | 2/1971 | Nalle, Jr. | 425/381 |
| 3,758,354 | 9/1973 | Sakurai et al. | 264/173 |
| 3,758,370 | 9/1973 | Sakurai et al. | 264/209.3 |

FOREIGN PATENT DOCUMENTS

| | | | |
|---|---|---|---|
| 582284 | 9/1959 | Belgium. | |
| 50-30677 | 10/1975 | Japan | 425/462 |
| 53-12975 | 2/1978 | Japan | 264/515 |
| 53-88060 | 8/1978 | Japan | 264/171 |
| 1333744 | 10/1973 | United Kingdom | 264/515 |
| 1352747 | 5/1974 | United Kingdom. | |
| 1392291 | 4/1975 | United Kingdom | 264/173 |

*Primary Examiner*—Jeffery Thurlow
*Attorney, Agent, or Firm*—Holman & Stern

[57] ABSTRACT

A unitary tubular product having an inner layer and an outer layer connected together by a bi-planar mesh formed of helical ribs bonded at their cross-over points is produced in a single coaxial tubular extrusion process, the structure being integrally or confluently extruded. The extruder die head has annular flow channels having closely-spaced die grooves.

9 Claims, 8 Drawing Figures

METHOD OF MAKING INTERNALLY CROSS-RIBBED PLASTICS MATERIAL STRUCTURE

BACKGROUND OF THE INVENTION

The invention relates to a unitary plastics material structure comprising a first layer, a second layer, and, between the layers, a first set and a second set of elements forming a bi-planar mesh, the first elements being united with the first layer, the first and second elements being united with each other at their cross-over points, and the second elements being united with the second layer. The invention relates to a method of producing the structure, to the structure itself and to apparatus for producing the structure.

GB No. 1,352,747 has suggested forming flat structures by extruding two plies as tubular extrusions, each plie having a single set of helical elements. The plies are slit, reheated and laminated together. Using this procedure, it is not possible to form tubular products.

Regarding the formation of tubular products, U.S. Pat. No. 3,464,450 discloses putting a single high-profile helical element between an inner layer and an outer layer. It is believed that there would be difficulties in producing the tubular product disclosed.

BE No. 582,284 discloses forming a tubular product by extrusion with a layer on the inside of a bi-planar mesh. The extrudate is blown in order to form film.

THE INVENTION

The present invention provides methods of producing a unitary, tubular plastics material structure by integral or confluent extrusion. The structure has inner and outer layers interconnected by a bi-planar mesh formed of inner and outer sets of helical elements whose helices are oppositely handed. The invention extends to the structure itself and to the apparatus for producing it.

The structures of the invention are unitary—however individual portions of the structures are recognisable visually and the terms "layer" and "element" are used herein for convenience in description to refer to such portions.

The structures of the invention can be used for a wide range of products, such as highly flexible "flat" film-like wrapping materials, rigid tubes or pipes, shipping containers or storage drum bodies, and parisons for vacuum forming or blow-moulding e.g. bottles, drums or shipping containers. With hot parisons, the parison is cooled by contacting the cold metal outer wall of the mould and by cold air in the middle, and the low thermal conduction of the plastic gives problems due to crystallite or spherulitic growth. It would be possible to start to cool the parison within the wall thickness as the mould begins to close. Alternatively, vacuum forming could be used to stop collapse of the wall upon itself. There may be some undulations on the interior, depending on the rib structure, but this may not matter. Tubular products can be slit to provide flat products. The films or sheets can have a thickness range for instance from 25 to 200 μm for film applications and from for instance 0.5 or 1 mm to 8 or 10 mm or even up to 40 mm for tubes or pipes or storage drum bodies. The products can thus be rigid or semi-rigid, i.e. self supporting in a stable geometrical configuration, or non-rigid.

In general terms, each layer can have a helical melt flow orientation, preferably extending parallel to the adjacent helical elements, and the helical elements themselves will have a more pronounced melt flow orientation and will act like reinforcing filaments, thereby providing improved strength. Reinforcement may occur even without orientation because the helical elements should give directional tear in the individual layers. Since the sets of helical elements are at an angle to each other, the structure resembles a conventional cross-laminated plain film or sheet but with added advantages.

One advantage is that the degree of connection between the layers can be varied as required for the particular product; the degree of connection is determined by the junction or contact area of the cross-over points of the sets of elements; the connections can twist to a lesser or greater extent as the angle between the sets of elements changes on distortion, or can rupture. This ensures that should tearing occur in the case of lightweight film or sheet products, each of the inner and outer layers can perform independently, thus reducing tear propagation.

Another advantage is that the product can be cooled quickly, and if necessary cooling may be assisted by the passage of a coolant fluid along the channels between the helical elements, e.g. in addition to cooling the inside of the inner layer or the outside of the outer layer. Even with no coolant fluid, the cooling is more rapid than with e.g. a tube of the same, but solid, wall thickness. In general terms, the invention provides the possibility of more precise control of cooling for thick-walled products, e.g. to control spherulitic growth or setting the plastics material more quickly to retain true melt flow orientation (avoiding excessive spherulitic growth in the centre); a proper rate of internal cooling is desirable if draw-down orientation is required. The internal channels will be helical and the hoop strength is not reduced proportionally to the amount of air space provided. The internal cooling can also be used to control the degree of connection.

The tubular structure of the invention can be stiffer than for a solid wall pipe of the same weight per unit length. In general, a tubular structure having the same properties as a solid extruded tube can be produced using 10% less plastics material.

The structure of the invention is produced in a single extrusion operation, in contrast to previous proposals to laminate or bond the materials together after extrusion and cooling. This can substantially reduce costs and improve the quality of the connections between the layers and the elements and between the elements themselves.

The structures of the invention are good insulators—for instance, if a pipe is being used as a water conduit, it is less susceptible to freezing.

The present invention can be used with any suitable extrudable thermoplastic material, e.g. low to high density polyethylenes, polypropylene or polyamides.

The terms "integrally extruded" or "confluently extruded" used herein cover extruding through a common die opening or contiguous die orifices in the die face, but also cover extruding through spaced die orifices where the separate plastics material streams become integral or adherent. This may be assisted by "die swell" or by the geometry of the die gaps or by deflection of the extrudate by sizing mandrel means or internal inflation in known manner. If a strong degree of connection is not required (though it will be for some uses such as pipes or storage drums), the streams can be brought into contact at a greater or lesser distance from the die face according to the degree of connection required.

The invention will be further described, by way of example, with reference to the accompanying drawings, in which.

Figure 1:
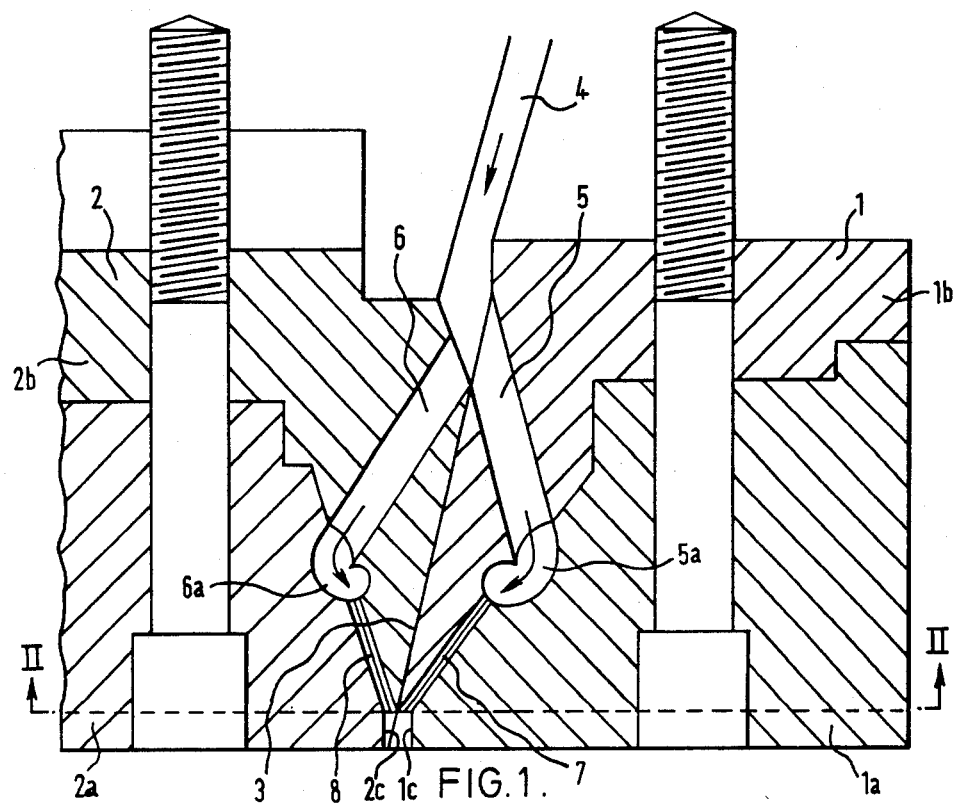
FIG. 1 is an axial cross-section through part of a pair of dies.

The extrusion apparatus can be of a conventional type, for instance generally as disclosed in GB No. 836,556 but with a die head modified according to the present invention as described hereinafter by way of example. The are two counter-rotating concentric circular dies 1, 2, in sliding contact along a surface 3. As shown in FIG. 1, there is a common polymer feed duct 4 which leads to a plurality of individual feed ducts 5, 6, supplying annular channels 5a, 6a.

Two rings of flow channels 7, 8 lead from the annular channels 5a, 6a to die gaps. As shown particularly in FIG. 2, the plain faces 7a, 8a of the flow channels 7, 8 are opposed by a plurality of closely spaced generally axially extending grooves 7b, 8b.

The die gaps simultaneously extrude layers (films or sheets) 9, 10 in spaced-apart but adjacent substantially parallel planes (see FIG. 7) each having a fairly flat face 11, 12 and a face formed with integrally-extruded, closely-spaced, helical elements or ribs 13, 14, the ribs 13 extending in an opposite helix to the ribs 14, the ribs 13 extending at an angle to the ribs 14. The layers 9, 10 and the associated ribs 13, 14 have helical melt flow orientations extending parallel to the respective ribs. The layers 9, 10 are connected together by the cross-over points 15 (one of which is shown cross-hatched in FIG. 7) of the ribs 13, 14 as a result of the integral or confluent extrusion forming a bi-planar integral lattice of rib-like elements between and interconnecting the layers 9, 10. There is thus coaxial extrusion of all the layers and elements of the structure.

The unitary plastics material product can therefore be considered as a two plie structure, each plie comprising a layer component 9, 10 and a ribbed component made up of the ribs 13, 14, the ribs of one ribbed component extending in a helical lay opposite to that of the ribs of the other ribbed component. The layer component and the ribbed component of each plie are extruded as a unit and the two plies are combined into the product by the integral or confluent extrusion of the cross-over points 15 of the ribs 13 with the ribs 14. The ribs 13, 14 do not penetrate substantially into the layer 9, 10 with which they are extruded, and stand proud. Preferably all the components are made of the same plastics material.

Figure 3:
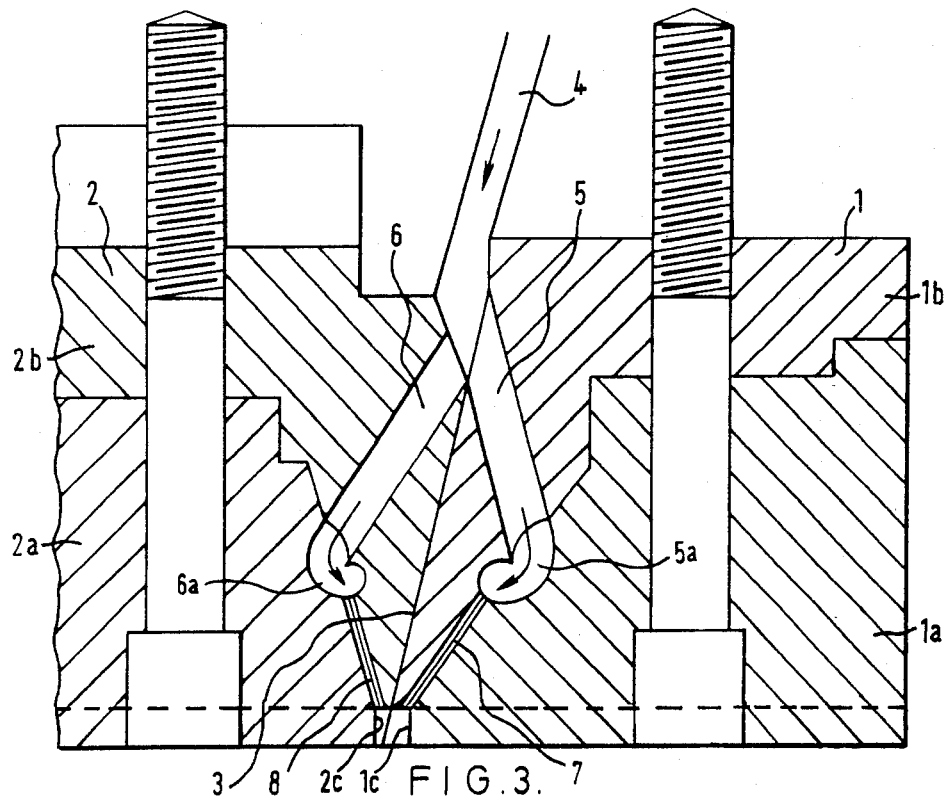
FIG. 3 is a section corresponding to part of FIG. 1, but showing a different die arrangement.
Figure 5:
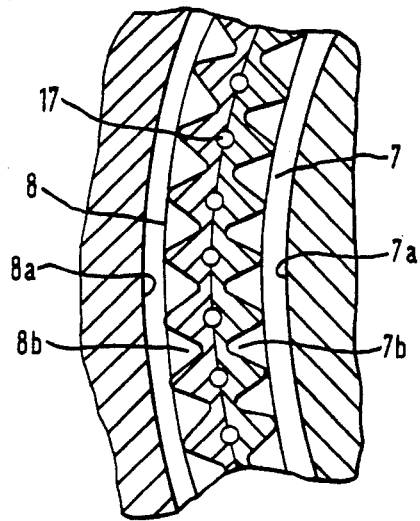
FIG. 5 is an enlarged fragmentary section along the line V—V in FIG. 4.

In the die head shown in FIG. 1, the die gaps are contiguous and a strong degree of connection is produced between the ribs 13, 14, the ribs 13, 14 being integrally extruded at their cross-over points. If it is desired to reduce the degree of connection, the die gaps can be separated, as shown in FIG. 3; here the cross-over points of the ribs 13, 14 are confluently extruded, the plastics material streams meeting whilst in the molten state, i.e. before hardening. If the flow channels 7, 8 are converging, as shown in FIGS. 1 and 3, the die gaps can be separated by grinding away the die faces.

Figure 2:
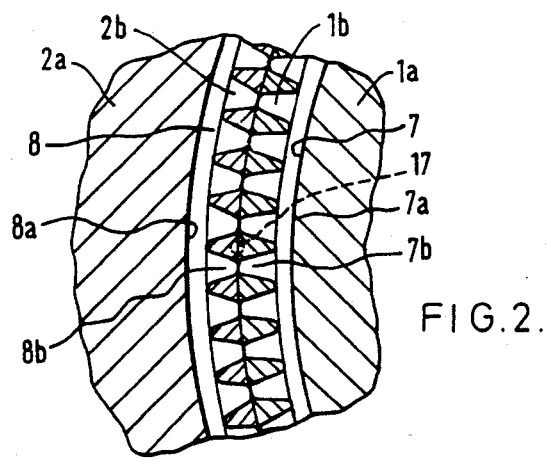
FIG. 2 is an enlarged fragmentary section along the line II—II in FIG. 1.
Figure 4:
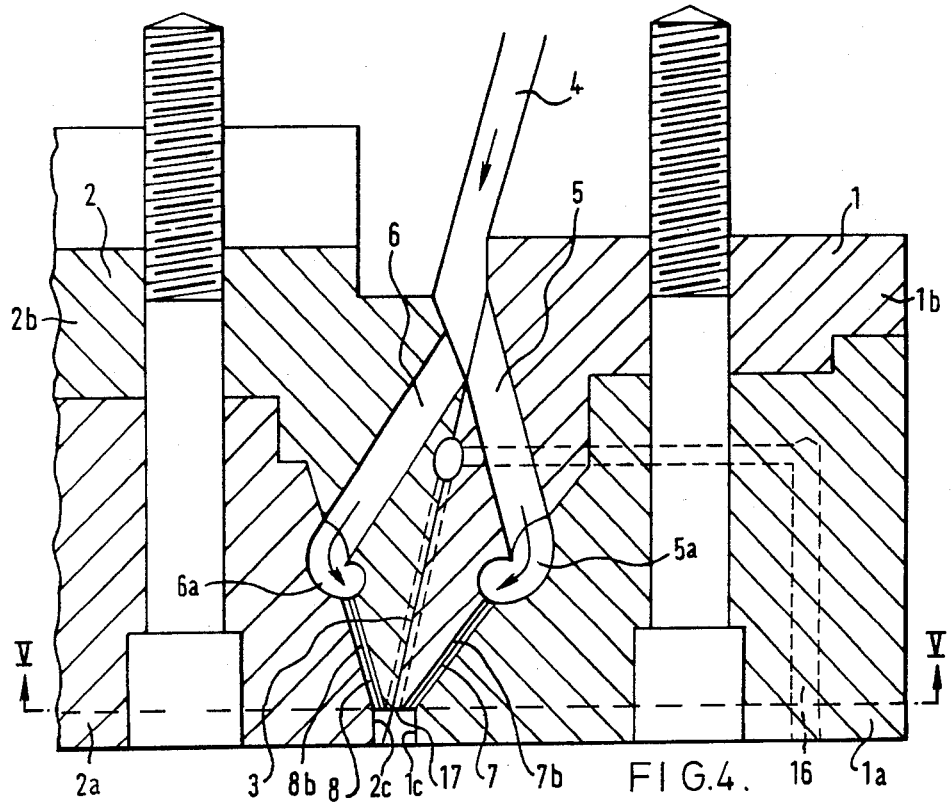
FIG. 4 is an axial section, corresponding to that of FIG. 3, but showing a die arrangement incorporating air duct means.

As shown in FIG. 4, a duct 16 and nozzles 17 can be provided for the passage of a fluid such as air or water along the channels 18 (FIG. 7) between the ribs 13, 14 and a similar arrangement can be provided if the polymer flows are contiguous, as in FIGS. 1 and 2 (one nozzle 17 is shown dotted in FIG. 2). The fluid may be primarily to prevent collapse of the structure and/or to cool. The fluid pressure can be slightly less than or greater than or equal to that used for blowing tubular film (see below). Alternatively, the reduced pressure created as the extruded material moves away from the die face can be used to draw in say air at atmospheric pressure, even if the nozzles 17 are small.

In practice, it is more convenient to have the axis of the die head horizontal, particularly for extruding tube or pipe. In general, but particularly if the axis is horizontal and if fluid is passed along the channels 18, there may be a tendency for the ribs 13, 14 to separate, especially as the configuration of the dies prevents flooding at the cross-over points. This tendency can be reduced or eliminated if the respective die lips, i.e. the die faces on the inside of the inner die gap and on the outside of the outer die gap, extend axially beyond the zone in which the ribs 13, 14 are united. As shown in FIGS. 1, 3 and 4, the inner die 1 and the outer die 2 are each formed in two pieces 1a, 1b and 2a, 2b. At the die faces, the die pieces 1a, 2a have smooth circular margins - internally there is a short cylindrical surface 1c, 2c, extending as far as the transverse plane in which the die pieces 1b, 2b terminate. Due to die swell, there is some compression in the annular gap so formed, modified by pulling the extrudate away from the dies (draw down). Particularly in the FIG. 4 embodiment, some cooling occurs in the annular gap, but in any case the plies are held together under restraint for a short period.

Alternatively, the die pieces 1a, 1b, 2a, 2b could all terminate in the same transverse plane, as indicated in the dashed line in FIGS. 1, 3 and 4. This would be suitable for light guage extrudates, e.g. such as those for forming film. In addition, it could be beneficial for film if the plies separate and come together immediately after the die face.

Figure 6:
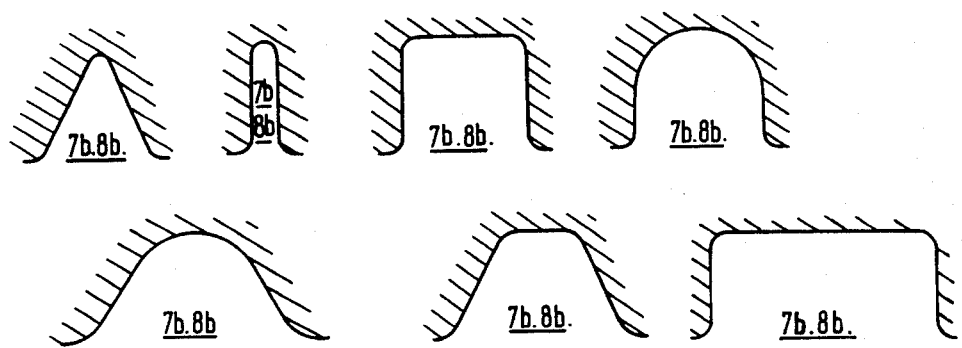
FIG. 6 shows fragmentary cross-sections of rib-forming groove shapes.

The cross-sectional shape of the grooves 7b, 8b is a factor in dictating the degree of connection between the ribs 13, 14. In FIG. 6 there are shown examples of groove cross-sections. A preferred cross-section is the bottom right, which is substantially rectangular and the width (circumferential dimension) is about twice the height (radial dimension), giving good contact at the cross-over points in spite of the absence of pronounced flooding, and thus a strong degree of connection. In general, the contact area of the cross-over points should be more than 25% for tube and pipe, though 25% may be satisfactory for film.

The number of grooves 7b, 8b is selected according to the product desired, and can vary from 2 to 20 or 40 per cm for most products of the invention. There can be up to 30 or 40% by volume air space in the sheet or film of the invention or in the wall of a tubular product of the invention. The grooves 7b, 8b should be sufficiently closely spaced to stop the outer layers of the product coming into contact with each other and preferably to avoid a marked or objectionable level of undulation of the outer layers.

The inner and outer layers may be of the same thickness, but need not be so. For instance, in a tubular product, there may be a thinner outer wall, or vice versa. A higher hoop stress with the same consumption of material can be achieved if the thicker wall is the inner wall; a higher moment for the same consumption of material can be achieved if the thicker wall is the outer wall. The relative thicknesses of the layers can be altered to achieve the best spherulite growth conditions. The thickness can be changed by changing the sizes of the flow channels 7, 8 leading to the dies (altering the die pressure) or changing the sizes of the die gaps.

At the die head, the temperatures may be as follows: plastics material, 240° C.; coolant, 80° C. The crystalline melt temperature of the plastics material may be 130°–150° C.

Figure 8:
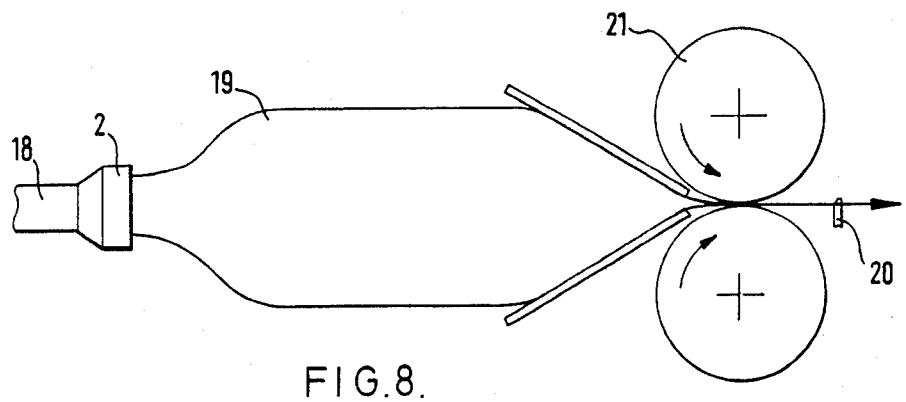
FIG. 8 is a schematic side view, showing blowing and slitting to form film.

The immediate product of extrusion is tubular, and if a flat product is eventually to be produced, the tubular product is allowed to set before slitting. Depending on the product to be formed and the type of orientation required, the extruded tube can be blown in known manner after extrusion, either before cooling or after cooling and re-heating. The final diameter increase in the case of films can be for instance from 10% of the die diameter up to 500% of the die diameter, depending on the specific product required. Such blowing produces circumferential expansion and coupled with haul-off speeds results in biaxial orientation of the product. The cooled product can be further biaxially orientated in a known manner. FIG. 8 shows an extruder 18 having the dies 1, 2. The tubular extrudate is blown at 19, slit by a knife 20, and wound onto a reel 21.

The helix angle of the ribs 13, 14 can be controlled by the speeds of rotation of the outer and inner dies 1, 2, and the helix angles can also be altered by the blow ratio. It is preferred that the helix angles be equal and opposite and this is most conveniently achieved by rotating the dies 1, 2 at equal speeds in opposite directions. The helix angles in the final product will depend upon the intended use. For instance, a film product may have equal and opposite helix angles of 45° whereas a pipe product may have equal and opposite helix angles of 54° to give higher hoop strength.

Figure 7:
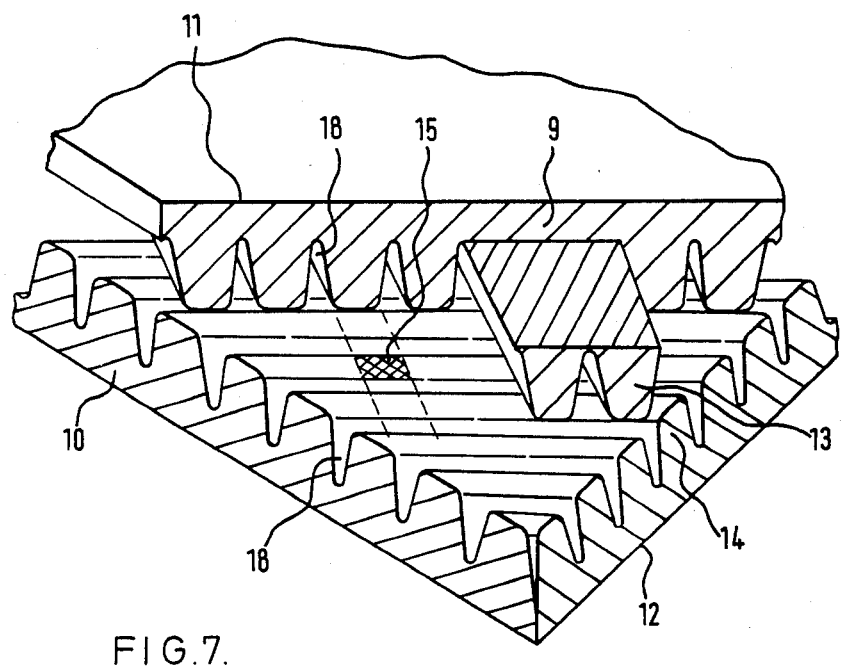
FIG. 7 is an isometric view of an internally cross-ribbed structure in accordance with the invention, part broken away.

The invention does not exclude the possibility of inserting an imperforate layer between the helical elements, thereby obtaining a further possibility for controlling the degree of connection between the outer layers. FIG. 7 illustrates that there is no substantial indentation of the tops of one set of ribs 13, 14 into the other at the cross-over points. Put in other words, each set of ribs 13, 14 is bounded by an inner notional cylindrical "plane" and an outer notional cylindrical "plane"; the outer "plane" of the inner set of ribs 13 is approximately or exactly coplanar with the inner "plane" of the outer set of ribs 14. There is consequently no substantial lateral squeezing out of plastics material at the cross-over points. Although there is die swell, its effect can be avoided by proper draw down. There is also little or no flooding, as explained above. Avoiding substantial indentation and flooding maximises the void space and gives good control of the cross-over points and degree of connection. This is contrasted with re-heating ribbed material to form a laminate with crossed ribs—in this case, the tops of the ribs will interpenetrate or indent at the cross-over points, squeezing plastics material out sideways.

We claim:

1. A method of producing a unitary, tubular, plastics material structure, comprising coaxially extruding in a single operation a tubular inner layer, a tubular outer layer and, between the layers, an inner set and an outer set of helical elements, the helices being oppositely handed and the helical elements forming a biplanar mesh, the inner helical elements being united with the inner layer, the inner and outer helical elements being united with each other at their cross-over points, and the outer helical elements being united with the outer layer, in each case the uniting being performed by integral or confluent extrusion whereby said plastics material structure comprises interconnected spaces between said inner and outer layers, defined between adjacent said helical elements of said inner set and between adjacent said helical elements of said outer set.

2. The method of claim 1, wherein the helical elements are extruded from respective die gaps which are spaced from each other, the distance apart being such that the respective sets of helical elements contact one another at cross-over points which become united as a result of the confluence of the helical elements whilst in a molten state.

3. The method of claim 1, wherein the inner layer and the inner helical elements are extruded through a single die gap with rib-forming grooves which form the inner helical elements as external ribs on the inner layer, and the outer layer and the outer helical elements are extruded through a single die gap with rib-forming grooves which form the outer helical elements as internal ribs on the outer layer.

4. The method of claim 1, wherein the inner and the outer layers are extruded through die means which are both rotating, in opposite directions.

5. The method of claim 1, wherein the helical elements are extruded through generally rectangular cross-section grooves whose circumferential dimension is about twice the radial dimension.

6. The method of claim 1, wherein the contact area at the cross-over points of the helical elements is greater than 25%.

7. The method of claim 1, wherein coolant fluid is passed during extrusion between the inner and outer layers along channels defined between the helical elements.

8. The method of claim 1, wherein the tubular plastics material structure is diametrically expanded by internal blowing subsequent to extrusion, in order to stretch the material.

9. The method of claim 1, wherein the tubular plastics material structure is slit to form a flat structure.

* * * * *

UNITED STATES PATENT AND TRADEMARK OFFICE
CERTIFICATE OF CORRECTION

PATENT NO. : 4,521,368
DATED : June 4, 1985
INVENTOR(S) : Frank B. Mercer & Keith F. Martin It is certified that error appears in the above—identified patent and that said Letters Patent is hereby corrected as shown below:

On the title page, Item [73] should read

-- [73] Assignee: Netlon Limited, Blackburn, England and Royal Packaging Industries Van Leer B.V., Amstelveen, Holland --.

Signed and Sealed this

Nineteenth Day of November 1985

[SEAL]

Attest:

DONALD J. QUIGG

Attesting Officer

Commissioner of Patents and Trademarks